(12) United States Patent
Arsenault et al.

(10) Patent No.: US 7,773,937 B2
(45) Date of Patent: *Aug. 10, 2010

(54) METHOD AND APPARATUS FOR IN-LINE DETECTION OF SATELLITE SIGNAL LOCK

(75) Inventors: Robert G. Arsenault, Redondo Beach, CA (US); Patrick J. Loner, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1618 days.

This patent is subject to a terminal disclaimer.

(21) Appl. No.: 11/030,266

(22) Filed: Jan. 6, 2005

(65) Prior Publication Data

US 2005/0108759 A1 May 19, 2005

Related U.S. Application Data (63) Continuation of application No. 09/853,954, filed on May 10, 2001, now Pat. No. 6,961,538, which is a continuation of application No. 09/477,240, filed on Jan. 4, 2000, now Pat. No. 6,272,313, which is a continuation of application No. 08/792,048, filed on Feb. 3, 1997, now Pat. No. 6,029,044.

(51) Int. Cl.
*H04H 1/00* (2006.01)

(52) U.S. Cl. ............... 455/3.02; 455/12.1; 455/67.13
(58) Field of Classification Search ............. 455/3.02, 455/12.1, 67.13, 422.1, 9, 13.4, 67.11, 226.1, 455/226.2, 226.3, 226.4, 69, 522, 266, 340, 455/303, 306, 307; 342/352, 359

See application file for complete search history.

(56) References Cited

U.S. PATENT DOCUMENTS

| | | | |
|---|---|---|---|
| 5,630,218 A | 5/1997 | Muto | |
| 5,797,083 A | 8/1998 | Anderson | |
| 5,826,170 A | 10/1998 | Hirschfield et al. | |
| 6,029,044 A | * 2/2000 | Arsenault et al. | ............. 725/68 |

(Continued)

OTHER PUBLICATIONS

Notice of Allowance and Fees Due issued by the United States Patent and Trademark Office mailed Jul. 6, 2005, corresponding to U.S. Appl. No. 09/853,854, filed on May 10, 2001, 9 pages.

(Continued)

*Primary Examiner*—Nguyen Vo (57) ABSTRACT

A method and system for detecting satellite signal lock in a satellite receiver system is disclosed. The system may include a first filter that isolates a noise frequency from the satellite signal, and/or a second filter that isolates a service frequency from the satellite signal. A comparator may then determine whether the output of the first and/or second filters is greater than a threshold level associated with an incipient loss of lock on the broadcast signal. The method includes the steps of filtering a received broadcast satellite signal to generate a service signal having a center frequency between a first transponder center frequency of a first transponder band and a second transponder center frequency of a second transponder band that overlaps the first transponder band, and comparing the output of the filter to a threshold value. In either the method or the apparatus, a command may be issued if the signal value is below the threshold value, thereby informing the user of the loss of signal lock.

10 Claims, 3 Drawing Sheets

U.S. PATENT DOCUMENTS 6,272,313 B1 * 8/2001 Arsenault et al. .......... 455/3.02
6,961,538 B2 * 11/2005 Arsenault et al. .......... 455/3.02

OTHER PUBLICATIONS

Non-Final Office action issued by the United States Patent and Trademark Office mailed Sep. 28, 2004, corresponding to U.S. Appl. No. 09/853,854, filed on May 10, 2001, 6 pages.

Notice of Allowance and Fees Due issued by the United States Patent and Trademark Office mailed May 21, 2001, corresponding to U.S. Appl. No. 09/477,240, filed on Jan. 4, 2000, 2 pages.

Non-Final Office action issued by the United States Patent and Trademark Office mailed Mar. 24, 2000, corresponding to U.S. Appl. No. 09/477,240, filed on Jan. 4, 2000, 13 pages.

Non-Final Office action issued by the United States Patent and Trademark Office mailed Jan. 23, 2001, corresponding to U.S. Appl. No. 09/477,240, filed on Jan. 4, 2000, 18 pages.

Final Rejection issued by the United States Patent and Trademark Office mailed Aug. 31, 2000, corresponding to U.S. Appl. No. 09/477,240, filed on Jan. 4, 2000, 15 pages.

Advisory Action issued by the United States Patent and Trademark Office mailed Nov. 28, 2000, corresponding to U.S. Appl. No. 09/477,240, filed on Jan. 4, 2000, 4 pages.

Notice of Allowance and Fees Due issued by the United States Patent and Trademark Office mailed Oct. 18, 1999, corresponding to U.S. Appl. No. 08/792,048, filed Feb. 3, 1997, 3 pages.

Non-Final Office action issued by the United States Patent and Trademark Office mailed Jul. 17, 1998, corresponding to U.S. Appl. No. 08/792,048, filed Feb. 3, 1997, 11 pages.

Non-Final Office action issued by the United States Patent and Trademark Office mailed Jan. 5, 1999, corresponding to U.S. Appl. No. 08/792,048, filed Feb. 3, 1997, 10 pages.

Final Rejection issued by the United States Patent and Trademark Office mailed Jun. 18, 1999, corresponding to U.S. Appl. No. 08/792,048, filed Feb. 3, 1997, 13 pages.

* cited by examiner

METHOD AND APPARATUS FOR IN-LINE DETECTION OF SATELLITE SIGNAL LOCK

CROSS REFERENCE TO RELATED APPLICATIONS

This application is a continuation of U.S. patent application Ser. No. 09/853,954, filed May 10, 2001 now U.S. Pat. No. 6,961,538, which is a continuation of U.S. patent application Ser. No. 09/477,240, filed Jan. 4, 2000, now U.S. Pat. No. 6,272,313, which is a continuation of U.S. patent application Ser. No. 08/792,048, filed Feb. 3, 1997, now U.S. Pat. No. 6,029,044, each of which is entitled "Method and Apparatus for In-Line Detection of Satellite Signal Lock," and each of which is incorporated herein by reference in their entirety.

BACKGROUND OF THE DISCLOSURE

The present invention relates generally to satellite communication systems, and more particularly to a method and system for detecting signal lock between a satellite receiver and a satellite in a digital DBS system.

Generally, in modern digital satellite communication systems a groundbased transmitter transmits a forward-error-coded uplink signal to a satellite positioned in geosynchronous orbit. The satellite in turn relays the signal back to a ground-based receiver antenna in a separate location. Direct broadcast satellite ("DBS") systems allow households to receive audio, data, and video directly from the DBS satellite. Each household subscribing to the system receives the broadcast signals through a receiver unit and a satellite dish receiver antenna.

The typical consumer DBS system consists of a satellite receiver antenna which includes an e.g. 18-inch parabolic dish and low noise block ("LNB"), and a receiver unit which may include an integrated receiver decoder module, or "IRD". The receiver antenna is typically mounted outside the house, and cables are provided to link the LNB to the indoor IRD and associated equipment (e.g. video display).

Several factors can degrade received DBS signals. For example, the satellite receiver antenna can accumulate snow, ice, leaves, or other debris unseen by the user. Remote blockage may also develop, such as shadowing foliage (e.g. trees). This accumulation or other shadowing obstruction can degrade the received signal strength enough to interrupt IRD operation. Furthermore, due to the significant amount of forward error correction used, the DBS picture or data quality may not suffer any noticeable decrease although signal strength is continuously degrading. When signal strength falls below a certain minimum, the signal can be completely lost without warning.

Other sources of DBS signal degradation include antenna tracking errors in mobile installations, such as ships, trains, or automobiles, each of which require constant adjustments to the receiver antenna's orientation. As with fixed DBS systems, the signal degradation in a mobile DBS installation can result in complete loss of signal lock without warning.

Therefore, there is a need for an inexpensive and simple method and system for automatically detecting signal degradation and for warning the user when a DBS signal is degrading, to provide an incipient signal loss warning or reaction. There is a particular need for such a method and system which may be added to existing satellite receiving equipment without modification, e.g. as an "add-on" device.

SUMMARY

The present invention provides an inexpensive and simple method and system to detect signal degradation and to warn the user that signal strength is degrading or has degraded below a given threshold. The present invention may be embodied in a system that processes a portion of the receive antenna/LNB output and splits this incoming RF signal. In a preferred embodiment, the signal is split into three components, one having the majority of the received power and the others having lesser power. The RF signal in one path (preferably one of the lesser-power paths) is passed through a filter that isolates a portion of the frequency spectrum corresponding at least predominantly to an intelligence carrying or "service" frequency signal, such as a portion of a satellite transponder signal of the DBS system. The RF signal in another path (preferably also lesser power) is passed through a second filter that isolates a portion of the frequency spectrum which contains only (or predominantly) "noise" signals.

The difference in power between the two filtered signal components is then detected. For example, the output of each filter is passed to a separate RF detector. Each RF detector converts the RF signal at its input to a DC voltage or some other output (e.g. a digital output) that is proportional to the input signal power. Scaling (e.g. amplification, attenuation, or digital manipulation) may be used to compensate for differences in absolute outputs of the one or more portions of the device. The difference between the two power levels is then detected. For example, in one embodiment a voltage corresponding to one of the RF signals (e.g. non-signal noise power) is passed through an inverter. This inverted signal is then summed with a DC signal corresponding to the other signal component (e.g. the service frequency signal power). In this way, a voltage is obtained which is proportional to the difference in the relative powers of the desired service signal and the noise signal (the "difference" value or voltage). Finally, the RF signal in the third path, preferably having the majority of received power, may be passed unaffected to a receiver (e.g. IRD) for normal processing.

The difference value or voltage can then be passed to a comparator (or several comparators) or the like for comparison to one or more predetermined thresholds. For instance, a difference voltage can be compared to a level corresponding to loss of signal lock. The difference voltage could also be compared to a level somewhat higher than the loss of signal lock level, relating to a degraded signal or incipient signal loss.

In another aspect of the invention, the system includes a user interface for alerting the user of an approaching loss of signal lock. The user interface may in part allow the user to activate an external device, or otherwise select a corrective measure from a menu of options to curtail signal loss.

The invention may be further embodied in a method that includes the steps of establishing a first threshold value (e.g. between the respective levels representative of the satellite signal and the noise), combining a value indicative of a noise frequency signal component with a value indicative of a service frequency signal component to obtain a difference signal value, comparing the difference signal value with a first threshold value, and issuing a command if the difference signal value is below the first threshold value. The command may indicate e.g. that signal lock has been lost. In another aspect of this method, the steps further include establishing at least a second threshold value greater than the first threshold value. The second threshold may be used e.g. to issue a warning that signal lock is degrading and may soon be lost.

The present invention thus provides a method and system for determining when a received signal has degraded, or has been lost, by detecting the relative levels of the desired (i.e. service frequency) to background (i.e. noise) signal components present in the signal. In certain embodiments, the method and system allows the user the opportunity to take steps to correct the degrading signal independent of the receiver. The method and system utilize a small number of simple electronic components and do not require a microprocessor (although one may be utilized), thereby allowing the unit to be more reliable and inexpensive. Furthermore, the method and system can warn the user of signal degradation and possible loss, allowing the user to take corrective measures before the signal is completely lost.

In preferred embodiments, the system may be implemented as an add-on accessory for use with a variety of receivers. In one preferred embodiment, the detection circuits may be housed in a module for insertion in-line between an LNB and an IRD. A bypass path or through line may be provided to conduct the majority of the received signal power directly from the LNB to the IRD. Because the invention operates to detect signal loss or degradation without requiring analysis of signal content or intelligence, the add-on device does not require complex tuners, decoders or error measurement circuits. The device may therefore in certain embodiments work independently of the IRD, other receiving components, or the signal format used for the satellite signal.

It is to be understood that both the foregoing general description and the following detailed description are exemplary and explanatory only, and are intended to provide further explanation of the invention as claimed. The invention, together with further objects and attendant advantages, will best be understood by reference to the following detailed description, taken in conjunction with the accompanying drawings.

BRIEF DESCRIPTION OF THE DRAWINGS

FIGS. 3(A-E) illustrate exemplary DBS broadcast frequencies, and preferred embodiments for the service signal and noise filter characteristics usable in one embodiment of the present invention.

DETAILED DESCRIPTION

Figure 1:
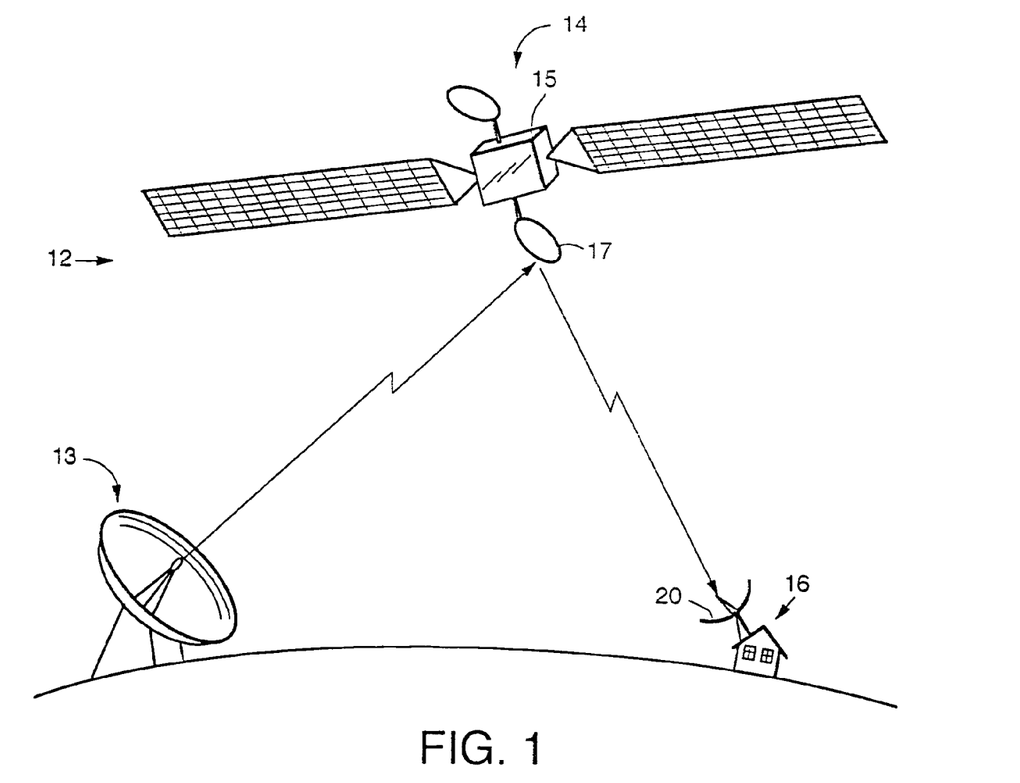
FIG. 1 illustrates a conventional direct-to-home DBS satellite television system capable of utilizing the present invention (prior art).

Referring now to the drawings, and more particularly to FIG. 1, a representative digital DBS system 12 capable of utilizing the present invention is shown. The DBS system 12 preferably includes a ground-based broadcast transmitter 13, a space segment 14 that includes a satellite 15, and a ground-based subscriber receiving station 16. In an exemplary DBS system, the satellite 15 is a geosynchronous satellite, such as the Hughes.RTM. HS-601.sup.TM. spacecraft, preferably positioned at a geosynchronous orbital location. The home subscriber receiving station 16 includes an outdoor receiver antenna 19 including a low noise block (LNB) 20 connected to an indoor receiver/decoder box (IRD, not shown) via a cable (also not shown).

The broadcast transmitter 13 receives digitally modulated television or audio signals and transmits them to the satellite 15. The satellite 15 translates the signals to a downlink frequency (e.g. in the Ku band) and transmits them to the receiver antenna 19 of the receiving station 16 for subsequent demodulation. The satellite 15 transmits downlink signals via on-board transponders 17 operating at a power level of e.g. 120 to 240 watts.

The LNB receives the downlink RF signals, amplifies them, and typically down-converts them (e.g. to the L band). When the downlink signal from the satellite 15 is received in the receiver antenna 19 with sufficient signal strength to be demodulated, the satellite signal is considered to be "locked" with the receiving station 16.

Figure 2:
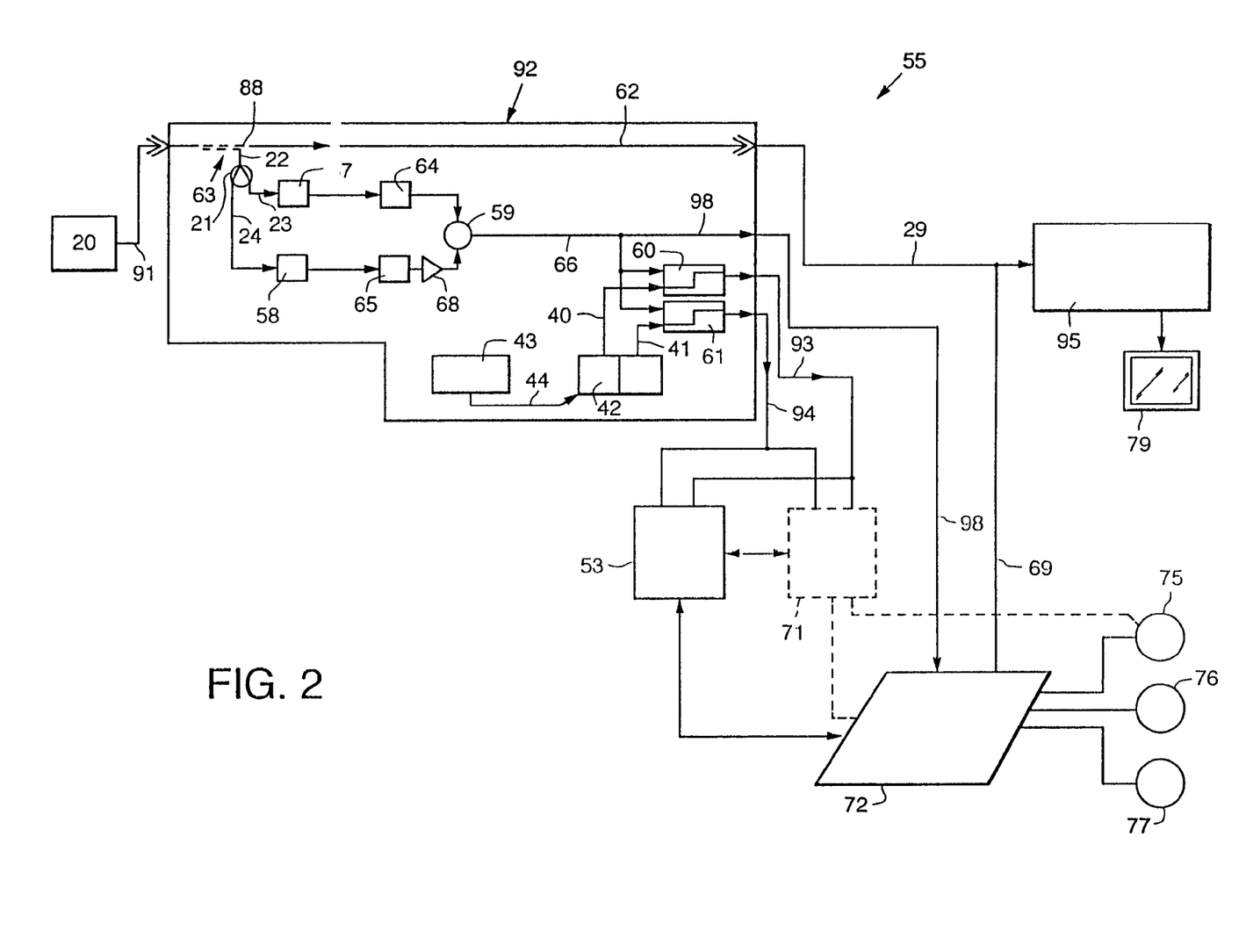
FIG. 2 is a diagram of an embodiment of the in-line detection apparatus according to the present invention.

A preferred embodiment of a lock-detect subsystem 55 for monitoring satellite signal lock is provided as described below. As shown in FIG. 2, the outside line 91 from the LNB 20 is connected to the lock detector 92 at an input 63. The input 63 preferably feeds a tap or coupler 88. A line 62 allows a portion (preferably a majority, e.g. 90 percent) of the LNB signal to pass through the detector 92 to the cable 29 and thus the IRD 95 regardless of whether the lock detector 92 or IRD 95 power is on or off. A portion 22 of the LNB signal is fed to a pair of filters 57 and 58. Filter 57 is a signal or service frequency filter, and filter 58 is a noise frequency filter. Preferably the portion 22 of the LNB signal fed to the filters is a relatively small percentage of the total LNB signal (e.g. 10 percent). A splitter 21 is preferably used to divide the portion 22 between the respective filters, into signals 23, 24.

In the specific embodiment illustrated, the output of filter 57 is passed to a radio frequency RF detector 64, which in turn is linked to an adder circuit or summer 59. The output of filter 58 is passed to a second RF detector 65, and to an inverter 68. The inverter 68 output is coupled to summer 59. The RF detectors 64 and 65 convert the measured average RF power level outputs of the filters 57 and 58 to obtain two representative output signals, e.g. DC voltage levels. The output signal 66 of summer 59 is supplied to one or more comparators, such as a pair of comparators 60 and 61. The outputs 93 and 94 from the comparators 60 and 61, respectively, may be functionally connected to one or more of indicator devices, logic 53, or switch 71.

The filter 57 preferably passes only signal or service frequencies corresponding to a range of a known service band or channel in the service spectrum. More than one range or channel may alternatively be included. Although preferably only signal or service frequencies are passed, it should be understood that in certain embodiments a limited amount of noise may also be passed, so long as the signal is predominantly comprised of service frequencies.

The filter 58, in contrast, passes a range of noise frequencies corresponding to a known region in the received spectrum where no service band or channel is present. Once again, although it is preferred that filter 58 pass only background noise components, in certain embodiments a limited amount of signal or service frequencies may also be passed, so long as the passed signal is predominantly comprised of noise (non-service) frequencies.

Figure 3A:
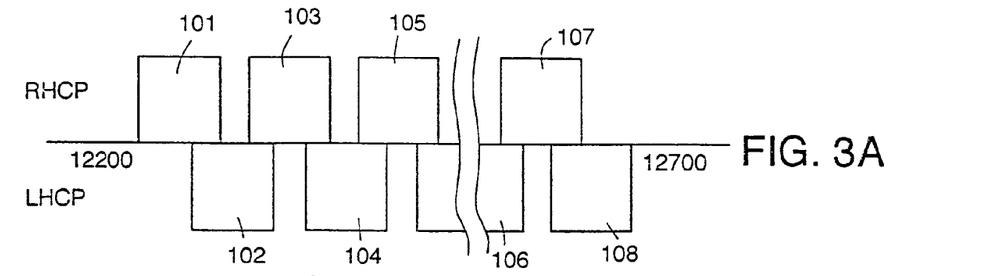
Figures 3B, 3C, 3D, 3E:
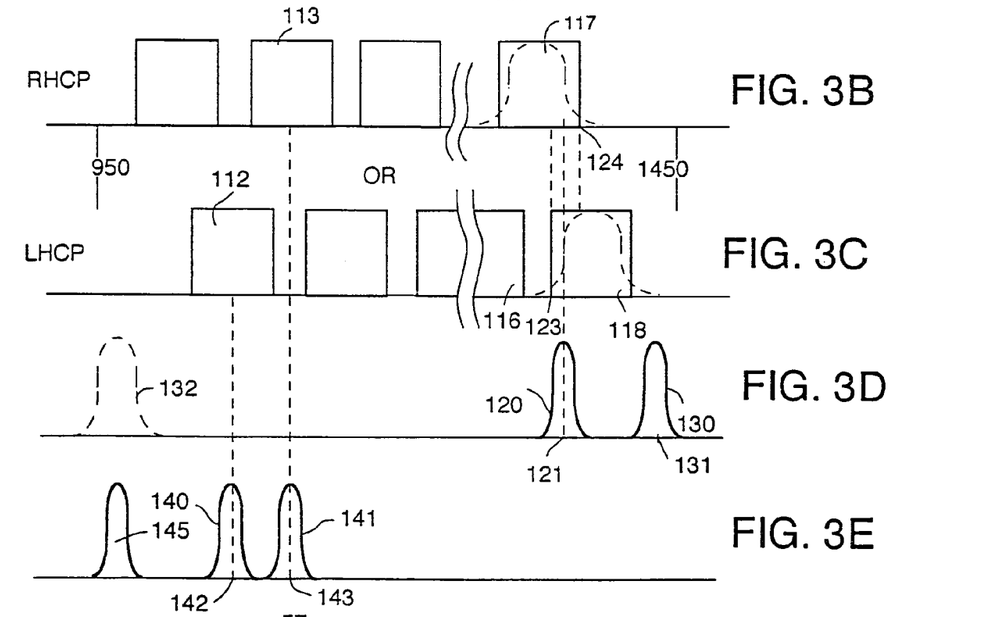

FIGS. 3 (A-E) illustrate preferred embodiments of frequency characteristics for filters 57, 58 in the context of a representative Ku band DBS system. FIG. 3(A) illustrates a typical downlink frequency utilization for a system having a plurality of transponders, each with an assigned frequency band (e.g. 101-108). In the system illustrated, these transponder signals (which may number e.g. 32) are located in a 500 MHz portion of the Ku band, e.g. between 12.2 and 12.7 GHz. As is known in the art, the signal carrying capacity within this assigned band can be increased by utilizing polarization multiplexing, e.g. right hand circular polarization (RHCP) and left hand circular polarization (LHCP). In the system illustrated, frequency bands for those transponders assigned to RHCP (101, 103, 105 and 107) are interleaved in a "staggered" fashion with those assigned LHCP (102, 104, 106 and 108). In general, the center frequency of a RHCP band (e.g. 103) corresponds to the center of a guard band lying between two adjacent LHCP transponder frequencies (e.g. 102, 104).

In manners known in the art, the LNB receives both RHCP and LHCP signals, but is configured electronically (or, in less preferred embodiments, mechanically) to discriminate and process only one of the respective polarizations. This signal is then typically down-converted in frequency to a 500 MHz portion of e.g. the L band, such as the spectrum between 950 MHz and 1.45 GHz. The LNB output will therefore correspond to the signal shown diagramatically in FIG. 3(B) if the LNB is configured to process RHCP signals, or the output shown in FIG. 3(C) if the LNB is configured to process LHCP signals.

The filter characteristics for filters 57, 58 are preferably chosen to support this frequency/polarization utilization scheme, permitting the lock-detect system 55 to function with standard equipment in commercial products and support their complete functionality, including LNB selection of RHCP or LHCP signals. FIG. 3(D) illustrates preferred filter characteristics. The signal or service frequency filter 57 has a passband center frequency 121 which preferably corresponds to the approximate middle frequency between the outer boundary (e.g. 124) of a selected RHCP transponder frequency band (e.g. 117), and the complimentary outer boundary (e.g. 123) of an overlapping LHCP transponder frequency band (e.g. 118). By selecting a filter passband corresponding to an "overlap" between the staggered RHCP and LHCP bands, a single filter (as illustrated in FIG. 2) can function to isolate service frequencies regardless of whether the LNB is processing RHCP or LHCP signals. In a known DBS system utilizing 32 equal transponder bands staggered between 12.2 and 12.7 GHz, the center frequency of the signal or service frequency filter 57 may be chosen to lie within the region of overlap between any adjacent LHCP and RHCP transponders, e.g. at C.sub.f.+-.0.7.29 MHz, where C.sub.f is the center frequency of a particular transponder.

The bandwidth or passband characteristic 120 of filter 57 is preferably selected to reduce susceptibility to variations in transponder roll-off characteristics from one transponder to the next, as well as variations in LNB local oscillator frequency. In general, it is desirable to provide a passband and roll-off characteristic to maximize the amount of signal (whether RHCP or LHCP) which is passed, while minimizing inclusion of noise signals in the adjacent guard band. In the representative system previously described, a standard 6 MHz wide bandpass filter may be used. Such filters are common in the cable industry.

Referring still to FIG. 3(D), the noise frequency filter 58 preferably passes a band of frequencies lying above (or below) the highest (or lowest) transponder band, and also below (or above) any neighboring spectrum allocation. By way of specific example, a known Ku-band DBS system operates within a 500 MHz band between 12.2 and 12.7 GHz. The LNB downconverts the signals to the L-band, between 950 and 1,450 MHz. A guard band of approximately 12 MHz separates the highest (and lowest) transponder band from the upper (and lower) limits of the assigned spectrum. This separation provides protection from interference by neighboring services, and should contain no intelligence-carrying signals.

Accordingly, it is preferred to select the passband characteristics of the noise filter 58 to correspond with one or both of these guard bands. A representative characteristic 130 is shown, with center frequency 131. The bandwidth of filter 58 is not critical (although preferably narrow enough to exclude signal frequencies). It may also be desirable to select a passband which is easily and inexpensively implemented, and which results in noise power levels having a value (when discriminated, as discussed below) in an appropriate range for ease of processing. In a preferred embodiment, the standard 6 MHz bandpass filter common in the cable industry may similarly be employed. As shown, the noise filter may have a greater or lesser passband (e.g. as shown in alternative 132), or noise signals could be derived from elsewhere.

Figure 4:
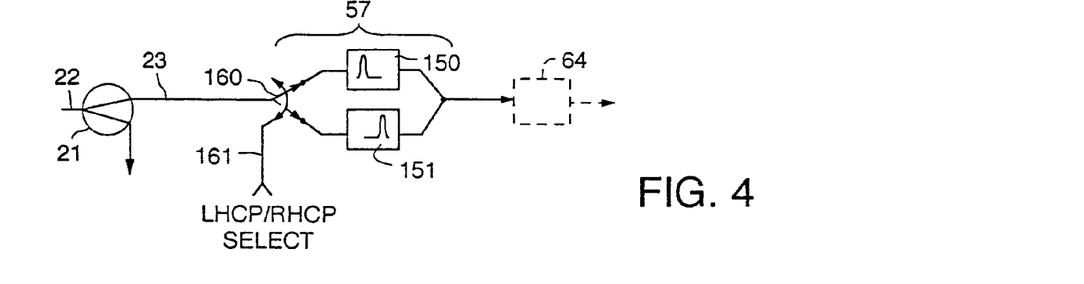
FIG. 4 shows an alternative embodiment of a portion of the embodiment of FIG. 2, corresponding to the embodiment illustrated in FIG. 3(E).

An alternative embodiment for accommodating selective polarizations in a staggered-frequency system is shown in FIG. 3(E) and FIG. 4. Service frequency filter 57 comprises a pair of individual bandpass filters 150, 151. Filter 150 has a passband characteristic 140 with a center frequency 142 preferably approximately centered within the transponder band (e.g. 112) of a first polarization (e.g. LHCP). The second filter 151 has a passband characteristic 141 with a center frequency 143 corresponding to the approximate center of a transponder band (e.g. 113) in the alternate polarization (e.g. RHCP). Although it is preferable for the filter passbands to be approximately centered within transponder bands, it should be understood that this is not essential so long as the passbands fall within the transponder bands. The filter characteristics are shown aligned with the adjacent LHCP and RHCP transponder bands. This is the preferred implementation in order to reduce the impact of any variation in the gain of the system over frequency. However, it is not necessary that adjacent bands be utilized, and any LHCP and RHCP band or bands could alternatively be selected. More than one may be used, with the signals either combined (for greater total signal) or averaged. When two or more are used and averaged, the resulting system is tolerant of the loss of a transponder, without adjustment. The specific filter characteristics and passbands are not critical, although they preferably fall within the transponder bands with minimal or no inclusion of noise signals in the guard bands. 6 MHz filters may be used for convenience, or filters having a wider passband (e.g. 20 MHz with a rolloff of −25 db.+−0.12 MHz) may be used to pass more received power. As with the previous embodiment, the noise component may be filtered preferably above or below the signal band (e.g. 145).

Referring again to FIG. 4 and to FIG. 2, the signal 23 may be provided to a switch 160 whose outputs are in turn connected to filters 150, 151. The state of switch 160 is determined by a select input 161, which preferably corresponds to the LNB control signal for selecting RHCP or LHCP output. In known systems, a first DC voltage level (e.g. 13 volts) is provided for a first polarization state, and a second DC voltage level (e.g. 17 volts) is provided for the alternate polarization state. These DC voltages provide control inputs to the LNB for selecting LHCP or RHCP output, and provide power to the LNB electronics. In a preferred embodiment, the same control voltages are utilized by the lock-detect subsystem 55 for determining the state of switch 160, and also for providing necessary power to the circuits of the device.

Although the foregoing specific embodiments illustrate operation of the present invention by utilization of certain frequencies, it should be understood that other signal and/or noise frequencies may alternatively be utilized.

Referring again to FIG. 2, the service frequency component is output from the filter 57 and supplied to the RF detector 64 for e.g. voltage conversion before being fed to summer 59, while the noise frequency component output from the filter 58 is fed to RF detector 65. The RF detectors may comprise any known devices and methods for generating outputs which are proportional to the power level of the input RF signals. Although simple analog components are preferred, digital or hybrid analog/digital circuits may alternatively be used. For example, the detectors may comprise A/D converters to convert the detected DC levels to digital format for subsequent processing.

In the preferred embodiment illustrated, one of the detected DC voltage levels (preferably corresponding to noise signals) is inverted by inverter 68, and supplied to the adder circuit 59. The summer 59 sums the voltage data and outputs a difference signal level or value at output 66. Alternatives may likewise be utilized for generating an output proportional to the difference between the respective RF power levels. For example, a voltage subtractor may be used in place of the inverter and adder. If digital conversion is used, a digital adder or subtractor may be used, or a microprocessor may determine the desired difference value.

The output indicative of the power difference is supplied, in a preferred embodiment, to a pair of step function comparators 60 and 61. The comparators 60 and 61 evaluate the difference in power levels of the signal and noise components. The comparator 60 determines whether the value is greater than a satellite signal loss threshold, which may be input 40 or otherwise provided. The satellite signal loss threshold is preferably settable and set sufficiently above the noise floor to represent the minimum signal level at which an acceptable satellite lock may be achieved in a given system, setup, and location. The received signal strength in a typical DBS system will vary from one region to another, and may be influenced by antenna location, installation and other variable factors. It is therefore preferable to have a lock threshold that can be adjusted to match the specific performance standards for a given installation.

The other comparator 61 in turn determines whether the value is greater than an intermediate threshold which may be input 41 or otherwise provided. The intermediate threshold is set sufficiently above both the noise floor and the signal loss threshold. The intermediate threshold preferably represents an intermediate signal strength level at which secure satellite lock is achieved. Other thresholds may also be provided, above or below the lock threshold. If digital conversion is used, the comparator(s) may comprise any known hardware or software-implemented comparison or difference detection.

The comparator(s) may be provided with fixed thresholds selected, e.g., to represent a state of degraded performance or of signal loss. The thresholds may be preset for certain locations or configurations, or normal operating conditions. In general, the signal to noise (S/N) ratio at the lock/unlock threshold will be independent of geographic location. It may nevertheless be desirable to have adjustable thresholds, to permit optimization for e.g. a particular receiver.

It may also be particularly beneficial to have adjustable intermediate threshold(s) which can be set, preset, or adjusted for optimum operation in a particular location. For example, where the received signal strength is higher, it may be desirable to set a higher intermediate threshold to provide maximum warning of an impending loss of signal. However, where the clear sky received signal strength is lower, the same intermediate threshold may result in an excessive number of "false alarms", and a lower intermediate threshold (closer to the loss of lock threshold) may be appropriate.

In particular embodiments, different thresholds may be utilized for different transponders within the assigned spectrum. By way of example, one known commercial DBS system utilizes 16 high power transponders transmitting at 240 watts, and 16 lower powered transmitters at 120 watts. The SIN ratio differs for the low and high powered transponders. To permit optimized operation, appropriate thresholds can be used depending on the nature (e.g. power) of a transponder whose signal is being utilized in these embodiments, of course, it is necessary to know which transponder the IRD is tuned to. In systems where the low/high power status of the transponders corresponds to the LNB polarization states (e.g. where all LHCP signals are broadcast by low power transponders, and all RHCP signals are broadcast by high power transponders), the polarization-select DC voltage may be used to also select appropriate thresholds. Other control signals or schemes could alternatively be used. In other embodiments, a single threshold (e.g. high power threshold) may be used for both transponders, providing adequate operation for many applications.

The comparators 60, 61 may be provided with external threshold inputs 40, 41. The thresholds may be generated by a threshold generator 42. In embodiments where comparators 60, 61 are analog devices, thresholds 40, 41 may be voltage levels output by the threshold generator 42. In preferred embodiments, threshold generator 42 provides adjustable threshold(s), and may comprise a manually adjustable trim resistor or resistor array. In this manner, manual adjustments can be made to tailor the device operation to a given region, equipment or installation.

In other embodiments, a D/A converter may be used. One or more digital words may then be input 44 from a source 43. The source 43 may comprise a predetermined memory (e.g. ROM) or variable memory (e.g. RAM or binary dip switches). In certain embodiments, the threshold values may be downlinked directly from the satellite 15 and stored in a buffer or memory. In particular embodiments, the threshold value may be adjusted by means of an on-screen user interface (e.g. by providing threshold generator 42 with suitable means for receiving signals from the user interface or associated circuits). Combinations are also possible. For example, a threshold value may be downlinked to the lock detector 92 and stored in memory 43, then later adjusted (e.g. incremented or decremented) by local adjustment (e.g. manual inputs via the user interface). Further, the thresholds may be adaptive relative to other inputs. For example, some (e.g. the intermediate) or all of the thresholds may be adjusted when temperatures fall below certain levels, to render the device more sensitive to reductions in signal strength that may be caused by temperature-related conditions (e.g. ice accumulation).

Where a plurality of detectors are utilized, each having a threshold, one or more of the thresholds may be derived from other(s) of the thresholds. For example, a first threshold value can be provided from satellite 15, input manually, or read from a memory or other source, e.g. 43. The other threshold value(s) may then be derived from the first threshold, for example, as a certain percentage or other function of the first threshold.

Some or all of the thresholds can also be region-specific in that the locally stored or the downloaded threshold is dependent on the zip code or other indicator (e.g. latitude and longitude) of where the IRD is installed. In one preferred embodiment, threshold values may be stored in memory corresponding to individual or preferably groups of zip codes.

Other regional or geographic correlations may similarly be utilized to select desired thresholds for different geographic regions.

The comparators 60 and 61 generate control voltages or other signals that represent the result of each comparison operation. The control signals are present on outputs 93 and 94. By way of example, a first level voltage at the output 93 may indicate that the satellite signal is not locked, or has fallen below the satellite signal loss threshold. A first level voltage at output 94 may indicate that the satellite signal has fallen below the intermediate threshold and is approaching the satellite signal loss threshold. This output 94 voltage may serve to warn users or the logic 53 of potential loss of the signal. Additional comparators may be utilized to give the lock-detector the capability to implement additional thresholds.

The control signals output at 93 and 94 from comparators 60 and 61 can have many advantageous uses in a satellite system such as a DBS receiver system, other than providing signal "lock" information to logic 53. For example, the outputs from comparators 60 and 61 may issue commands via an output link such as switch unit 71 or directly to another external device 75. The lock-detect apparatus 92 can thus automatically activate, for example, a corrective cycle to melt accumulated ice or snow which is degrading reception in response to degrading signal conditions. Because the apparatus 92 may operate independently of the receiving apparatus, such as IRD 95, the receiving apparatus need not be operating in order for the apparatus 92 and external device (e.g. heater) to operate.

Figure 5:
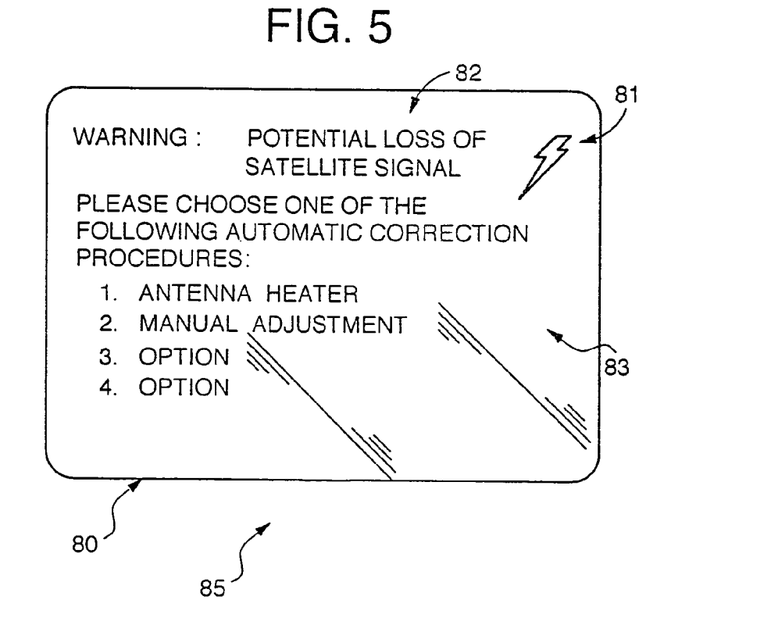
FIG. 5 shows a user interface screen capable of integration with the in-line detection apparatus of the present invention.

Referring now to FIGS. 2 and 5, the output(s) of the comparators may be further linked to a user interface generator 72. The generator 72 in turn has a feed line 69 linked directly to cable 29, which, as described previously, is linked to the IRD 95 and television set 79. The direct output 66 from the summer 59 may also be linked via output 98 to the interface generator 72, to provide a difference signal value output 66 for use in signal strength calculations in a generated signal strength meter.

Upon detecting a signal (e.g. from switch unit 71 or logic 53, or directly from outputs 93 and/or 94) indicating signal degradation, the interface generator 72, through conventional means known in the art, sends a signal through the cable 29 to the IRD 95. The IRD 95 in turn preferably causes a visual or aural response, such as a small icon 81, to be generated by the television set 79 or the IRD itself.

The user can then use a remote control (not shown) to cause the generator 72 to control a user interface, preferably an on-screen user interface, such as shown in FIG. 5, through conventional means known in the art. This user interface 85 preferably comprises a menu 80 to explain to the user the various options 83 available to correct the degradation of the satellite signal. In one particular example related to snow or ice accumulation, an antenna heater can be activated by choosing its respective menu option or otherwise. In another embodiment, a realignment means or boresighter, such as an antenna rotor, can be activated. In certain embodiments, once the selected external device, such as device(s) 75-77, has been activated through the user interface 85, the selected device(s) 75-77 may cause the user interface generator 72 to reset. The generated menu 80 and icon 81 are thus removed from the screen. In the meantime, the satellite lock detector 92 may continue to monitor the incoming signal from the LNB 20, and may cause the generator 72 to generate the icon 81 again if the corrective device is not successful in improving the satellite signal strength. Many other uses and options are likewise possible.

Preferably, the present embodiment of the lock detector 92 is adapted for use with a variety of systems such as DBS direct-to-home satellite receiver systems. For example, a user may purchase the lock detector alone as an accessory, or in combination with e.g. a satellite dish antenna heater, and retrofit the system to an existing DBS system. The lock-detect device preferably may be installed in any easily accessible area between the LNB and the indoor IRD unit. The methods and apparatus may also be employed in other RF transmission systems, such as LMDs, MMDs or other terrestrial broadcast services whose signals may be degraded by environmental factors.

Although lock detector 92, interface unit 72, and IRD 95 are shown as separate units, it should be understood that in certain embodiments some or all of these elements may be combined.

The method and system for satellite lock-detect described herein allows the system subscriber to conveniently determine when the satellite downlink signal at the antenna has degraded to a particular point, including (but not limited to) a point that the signal may be completely lost upon further attenuation. By warning the subscriber of these conditions around the antenna, the subscriber can take corrective steps before the signal is completely lost, or be informed of automatic corrective steps taken by logic 53.

Because the components of the unit in certain embodiments are relatively simple and easy to implement logic functions, expensive microprocessors are not needed although they may be utilized. Furthermore, because certain embodiments of the lock detector system described herein preferably are mounted in-line and separate from the receiving device itself and do not require analysis of the received information content, the receiving device need not be turned on for the system to operate, and the system operates independently of the information encoding or protocols used.

Of course, it should be understood that a wide range of changes and modifications can be made to the embodiments described above. It is therefore intended that the foregoing detailed description be regarded as illustrative rather than limiting and that it be understood that it is the following claims, including all equivalents, which are intended to define the scope of this invention.

Some or all of the thresholds can also be region-specific in that the locally stored or the downloaded threshold is dependent on the zip code or other indicator (e.g. latitude and longitude) of where the IRD is installed. In one preferred embodiment, threshold values may be stored in memory corresponding to individual or preferably groups of zip codes. Other regional or geographic correlations may similarly be utilized to select desired thresholds for different geographic regions.

The comparators 60 and 61 generate control voltages or other signals that represent the result of each comparison operation. The control signals are present on outputs 93 and 94. By way of example, a first level voltage at the output 93 may indicate that the satellite signal is not locked, or has fallen below the satellite signal loss threshold. A first level voltage at output 94 may indicate that the satellite signal has fallen below the intermediate threshold and is approaching the satellite signal loss threshold. This output 94 voltage may serve to warn users or the logic 53 of potential loss of the signal. Additional comparators may be utilized to give the lock-detector the capability to implement additional thresholds.

The control signals output at 93 and 94 from comparators 60 and 61 can have many advantageous uses in a satellite system such as a DBS receiver system, other than providing signal "lock" information to logic 53. For example, the outputs from comparators 60 and 61 may issue commands via an output link such as switch unit 71 or directly to another external device 75. The lock-detect apparatus 92 can thus automatically activate, for example, a corrective cycle to melt accumulated ice or snow which is degrading reception in response to degrading signal conditions. Because the apparatus 92 may operate independently of the receiving apparatus, such as IRD 95, the receiving apparatus need not be operating in order for the apparatus 92 and external device (e.g. heater) to operate.

Referring now to FIGS. 2 and 5, the output(s) of the comparators may be further linked to a user interface generator 72. The generator 72 in turn has a feed line 69 linked directly to cable 29, which as described previously, is linked to the IRD 95 and television set 79. The direct output 66 from the summer 59 may also be linked via output 98 to the interface generator 72, to provide a difference signal value output 66 for use in signal strength calculations in a generated signal strength meter.

Upon detecting a signal (e.g. from switch unit 71 or logic 53, or directly from outputs 93 and/or 94) indicating signal degradation, the interface generator 72, through conventional means known in the art, sends a signal through the cable 29 to the IRD 95. The IRD 95 in turn preferably causes a visual or aural response, such as a small icon 81, to be generated by the television set 79 or the IRD itself.

The user can then use a remote control (not shown) to cause the generator 72 to control a user interface, preferably an on-screen user interface, such as shown in FIG. 5, through conventional means known in the art. This user interface 85 preferably comprises a menu 80 to explain to the user the various options 83 available to correct the degradation of the satellite signal. In one particular example related to snow or ice accumulation, an antenna heater can be activated by choosing its respective menu option or otherwise. In another embodiment, a realignment means or boresighter, such as an antenna rotor, can be activated. In certain embodiments, once the selected external device, such as device(s) 75-77, has been activated through the user interface 85, the selected device(s) 75-77 may cause the user interface generator 72 to reset. The generated menu 80 and icon 81 are thus removed from the screen. In the meantime, the satellite lock detector 92 may continue to monitor the incoming signal from the LNB 20, and may cause the generator 72 to generate the icon 81 again if the corrective device is not successful in improving the satellite signal strength. Many other uses and options are likewise possible.

Preferably, the present embodiment of the lock detector 92 is adapted for use with a variety of systems such as DBS direct-to-home satellite receiver systems. For example, a user may purchase the lock detector alone as an accessory, or in combination with e.g. a satellite dish antenna heater, and retrofit the system to an existing DBS system. The lock-detect device preferably may be installed in any easily accessible area between the LNB and the indoor IRD unit. The methods and apparatus may also be employed in other RF transmission systems, such as LMDs, MMDs or other terrestrial broadcast services whose signals may be degraded by environmental factors.

Although lock detector 92, interface unit 72, and IRD 95 are shown as separate units, it should be understood that in certain embodiments some or all of these elements may be combined.

The method and system for satellite lock-detect described herein allows the system subscriber to conveniently determine when the satellite downlink signal at the antenna has degraded to a particular point, including (but not limited to) a point that the signal may be completely lost upon further attenuation. By warning the subscriber of these conditions around the antenna, the subscriber can take corrective steps before the signal is completely lost, or be informed of automatic corrective steps taken by logic 53.

Because the components of the unit in certain embodiments are relatively simple and easy to implement logic functions, expensive microprocessors are not needed although they may be utilized. Furthermore, because certain embodiments of the lock detector system described herein preferably are mounted in-line and separate from the receiving device itself and do not require analysis of the received information content, the receiving device need not be turned on for the system to operate, and the system operates independently of the information encoding or protocols used.

Of course, it should be understood that a wide range of changes and modifications can be made to the embodiments described above. It is therefore intended that the foregoing detailed description be regarded as illustrative rather than limiting and that it be understood that it is the following claims, including all equivalents, which are intended to define the scope of this invention.

We claim:

1. A device for use in a satellite communication system having an antenna that receives a broadcast signal and an integrated receiver decoder coupled to the antenna the device comprising:
    circuitry that is adapted to be coupled to the satellite communication system to convey a portion of the broadcast signal from the antenna to the integrated receiver decoder, to pass a service signal to a first output, and to pass a noise signal to a second output;
    a difference circuit coupled to the first and second outputs to produce a difference signal; and
    a comparison circuit that compares the difference signal to a threshold associated with an incipient loss of lock on the broadcast signal.

2. The device of claim 1, wherein the circuitry further comprises:
    a first filter circuit that is adapted to be coupled to the antenna to pass the service signal to the first output; and
    a second filter circuit that is adapted to be coupled to the antenna to pass the noise signal to the second output.

3. The device of claim 2, wherein the first filter circuit has a first passband within a first transponder band having a first polarization and a second passband within a second transponder band having a second polarization.

4. The device of claim 1, wherein the circuitry has a passband center frequency between a staggered pair of transponder frequencies.

5. The device of claim 1, further comprising first and second radio frequency detectors coupled between the respective first and second outputs and the comparison circuit, wherein each of the first and second radio frequency detectors generates a respective voltage signal.

6. The device of claim 1, further comprising an inverter coupled to the second output and an adder coupled to the first output and an output of the inverter.

7. The device of claim 1, wherein the comparison circuit further compares difference signal to a second threshold associated with a loss of lock on the broadcast signal.

8. The device of claim 1, wherein the threshold is generated using one of information within the broadcast signal, a geographic location associated with the antenna, a zip code, a type of transponder currently being tuned by the integrated receiver decoder and or an ambient temperature surrounding the antenna.

9. The device of claim 1, wherein the comparison circuit is adapted to provide a corrective output signal based on the comparison of the threshold and the difference signal.

10. The device of claim 9, wherein the corrective output signal activates a heater to heat the antenna.

* * * * *